(12) United States Patent
Millard

(10) Patent No.: US 6,623,650 B2
(45) Date of Patent: Sep. 23, 2003

(54) PROCESSES AND APPARATUS FOR TREATING SEWAGE OR LIKE SLUDGE

(75) Inventor: Robin Millard, Prestbury (GB)

(73) Assignee: R3 Management Limited (GB)

( * ) Notice: Subject to any disclaimer, the term of this patent is extended or adjusted under 35 U.S.C. 154(b) by 0 days.

(21) Appl. No.: 09/981,136

(22) Filed: Oct. 16, 2001

(65) Prior Publication Data

US 2002/0043500 A1 Apr. 18, 2002

Related U.S. Application Data

(60) Provisional application No. 60/245,020, filed on Nov. 1, 2000, and provisional application No. 60/265,002, filed on Jan. 30, 2001.

(30) Foreign Application Priority Data

Oct. 18, 2000 (GB) .............................................. 0025492
Jan. 11, 2001 (GB) .............................................. 0100682

(51) Int. Cl.⁷ ................................................. C02F 1/50
(52) U.S. Cl. ....................... 210/764; 210/766; 210/770; 210/198.1; 210/259
(58) Field of Search ................................ 210/764, 766, 210/768, 770, 790, 198.1, 252, 259

(56) References Cited

U.S. PATENT DOCUMENTS

| 4,079,003 A | 3/1978 | Manchak ...................... 210/46 |
| 4,306,978 A | 12/1981 | Wurtz ......................... 210/750 |
| 4,341,562 A | 7/1982 | Ahlbeck ....................... 106/97 |
| 4,432,800 A | 2/1984 | Kneller et al. ................. 106/85 |
| 4,554,002 A | 11/1985 | Nicholson ..................... 71/12 |
| 4,781,842 A | 11/1988 | Nicholson ..................... 210/751 |
| 4,872,998 A | 10/1989 | Dausman et al. ............ 210/710 |
| 4,902,432 A | 2/1990 | Kuno .......................... 210/764 |
| 4,997,572 A | 3/1991 | Wurtz ......................... 210/710 |
| 5,013,458 A | 5/1991 | Christy, Sr. et al. ......... 210/751 |
| 5,135,664 A | 8/1992 | Burnham ...................... 210/751 |
| 5,186,840 A | 2/1993 | Christy et al. ............... 210/709 |
| 5,275,733 A | 1/1994 | Burnham ...................... 210/609 |
| 5,277,826 A | 1/1994 | Burns et al. ................. 210/751 |
| 5,279,637 A | 1/1994 | Lynam et al. ................. 71/12 |
| 5,385,673 A | 1/1995 | Fergen ........................ 210/710 |
| 5,417,861 A | 5/1995 | Burnham ...................... 210/609 |
| 5,435,923 A | 7/1995 | Girovich ...................... 210/770 |
| 5,547,486 A | 8/1996 | Detrick et al. ................. 71/28 |
| 5,554,279 A | 9/1996 | Christy ........................ 210/149 |
| 5,557,873 A | 9/1996 | Lynam et al. ................. 34/379 |
| 5,618,442 A | 4/1997 | Christy ........................ 210/742 |
| 5,679,262 A | 10/1997 | Girovich et al. ............ 210/751 |
| 5,853,450 A | 12/1998 | Burnham et al. ................ 71/9 |
| 5,853,590 A | 12/1998 | Burnham ...................... 210/609 |
| 6,079,122 A | 6/2000 | Rajkovich ..................... 34/574 |
| 6,387,281 B2 * | 5/2002 | Millard et al. |

FOREIGN PATENT DOCUMENTS

| DE | 0 31 28 673 | 3/1982 | ........... C05F/7/00 |
| EP | 0 283 153 B1 | 10/1992 | ........... C05F/7/00 |
| GB | 2 276 876 A | 10/1994 | ........... C02F/11/14 |
| GB | 2 363 376 | 12/2001 | ........... C02F/11/14 |
| JP | 1997-046705 | 11/1996 | ........... C02F/11/00 |
| WO | WO 98/29348 | 7/1998 | ........... C02F/11/14 |
| WO | WO 99/57081 | 11/1999 | ........... C05F/11/08 |
| WO | WO 01/72647 | 10/2001 | ........... C02F/11/14 |

* cited by examiner

Primary Examiner—Betsey Morrison Hoey
(74) Attorney, Agent, or Firm—Bracewell & Patterson, LLP

(57) ABSTRACT

There is disclosed a process for treating sewage or similar organic sludge to produce a pasteurized and dried product comprising the steps of:

drying the sludge to substantially the desired dry solids content of the product;

and thereafter adding an alkaline admixture to the dried sludge in order to pasteurize and/or stabilize the sludge and thereby produce the product without employing subsequent drying by aeration.

31 Claims, 7 Drawing Sheets

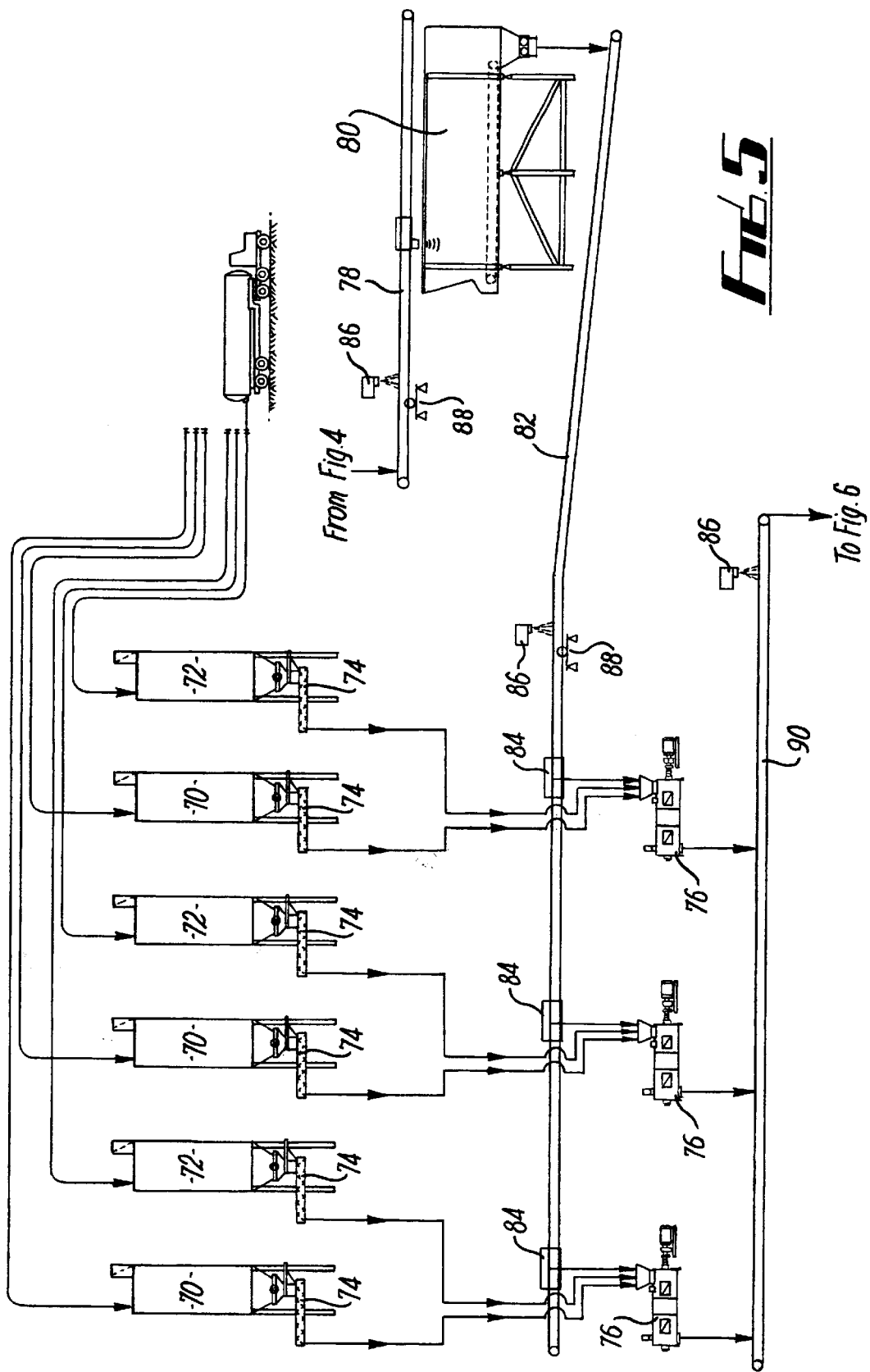

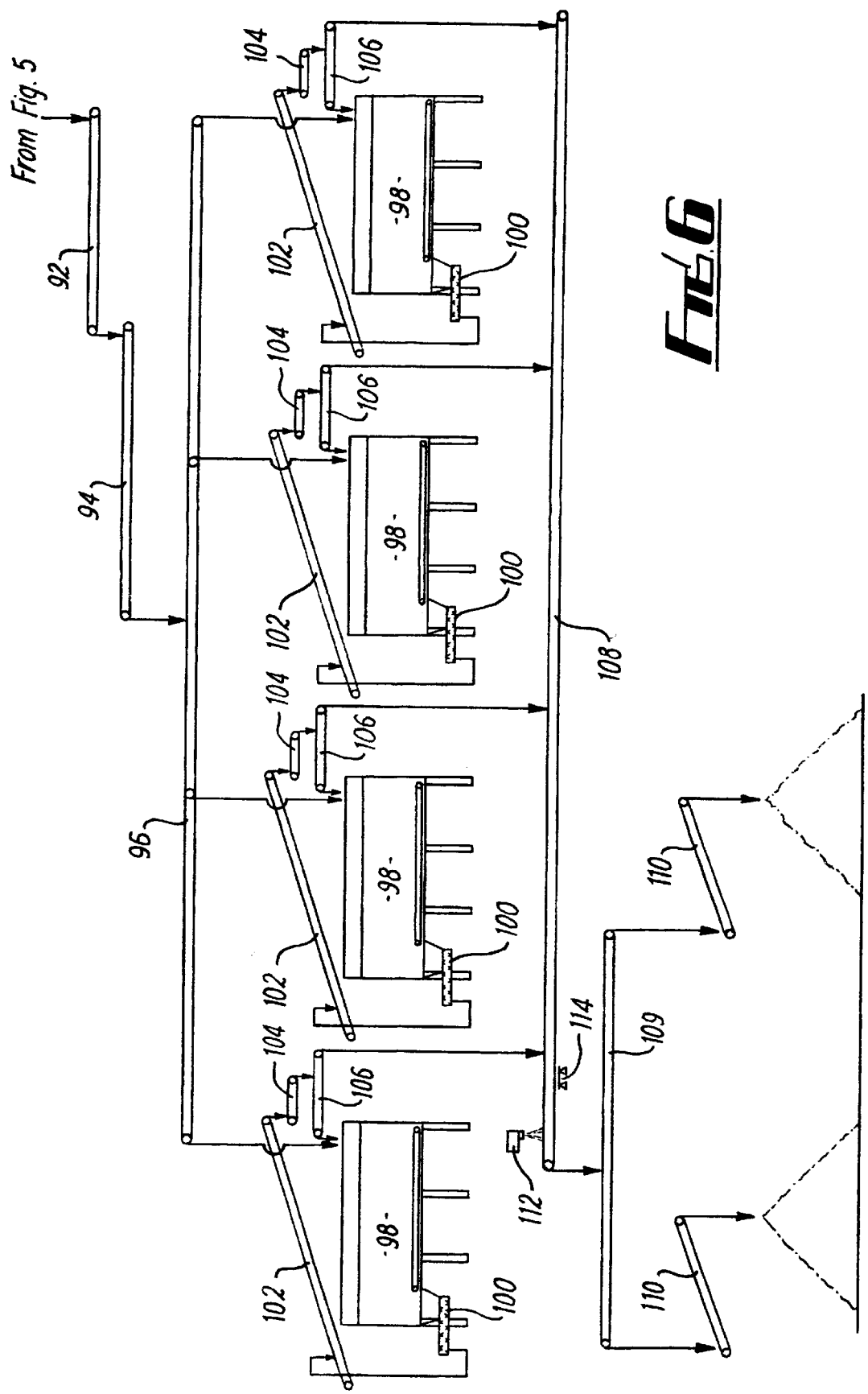

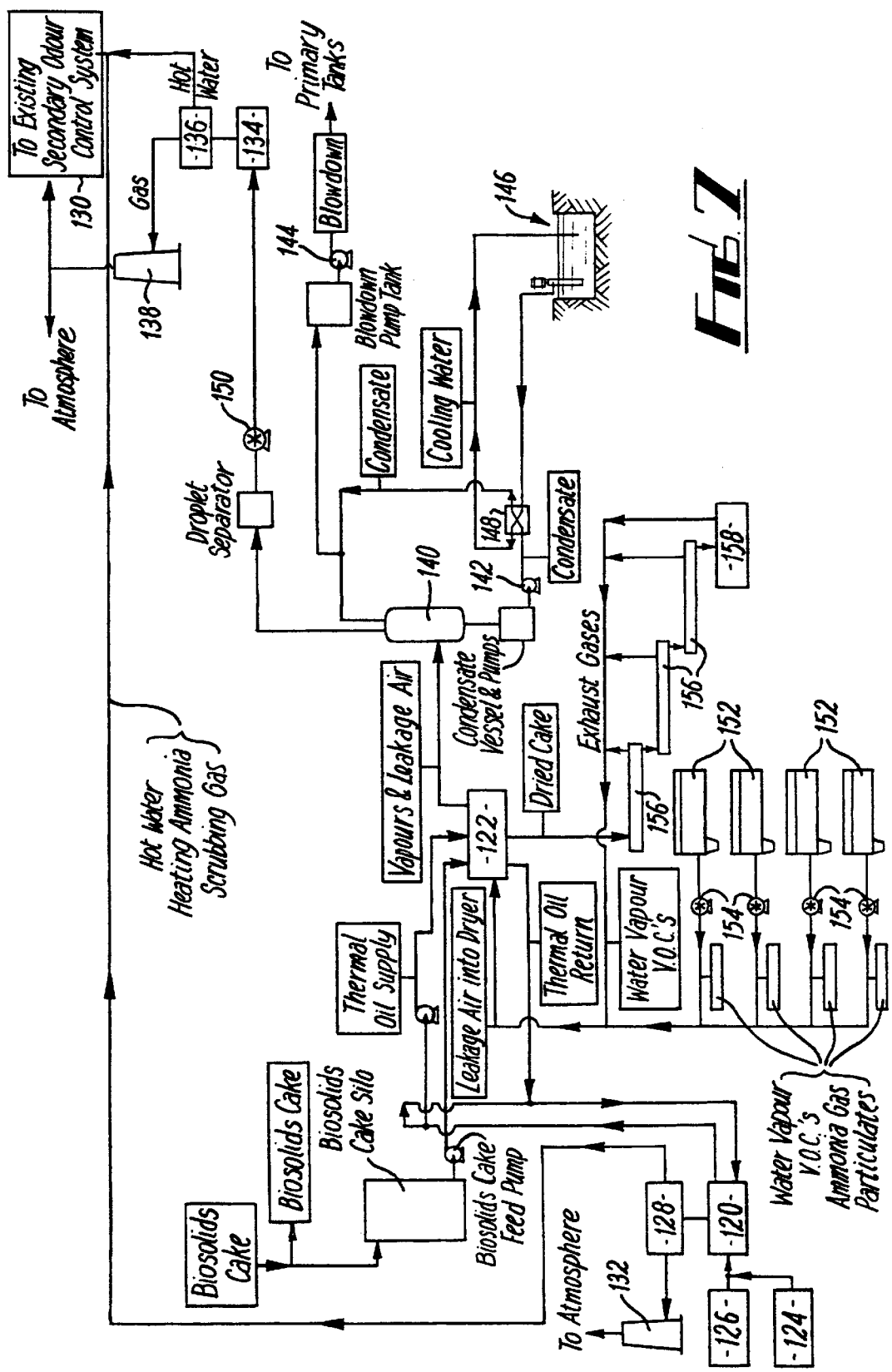

PROCESSES AND APPARATUS FOR TREATING SEWAGE OR LIKE SLUDGE

CROSS REFERENCE TO RELATED APPLICATIONS

This application claims priority based upon Great Britain Application Ser. No. 0025492.0, filed Oct. 18, 2000; U.S. Provisional Application Ser. No. 60/245,020, filed Nov. 1, 2000; Great Britain Application Ser. No. GB 0100682.4, filed Jan. 11, 2001; and U.S. Provisional Application Ser. No. 60/265,002, filed Jan. 30, 2001.

BACKGROUND OF THE INVENTION

1. Field of the Invention

This invention relates to processes and apparatus for treating sewage sludge or similar organic sludge, such as that obtained from industrial sites such as waste water treatment plants.

2. Description of the Prior Art

EP 0 283 153 B1 discloses a method of treating wastewater sludge to provide a fertiliser for agricultural lands which can be applied directly to the land. The method involves mixing the sludge with alkaline material of specified fineness to raise the pH of the mixture to at least 12 for at least a day and to effect pasteurisation, and then drying the mixture. Drying is done either a) by aeration and maintaining the pH above 12 for at least seven days until the solids levels reach and maintain a minimum of 65% bulk solids, or b) by aeration and heating to a temperature of at least 50° C. and so that the solids levels reach and maintain a minimum of 50% solids. In b) the temperature should not be so high as to destroy all non-pathogenic organisms. The elevation of the pH and the drying are effected so as to reduce odour and undesirable viruses, bacteria, parasites and vector (e.g. flies) attraction to the sludge and prevent significant pathogen regrowth while not eliminating beneficial non-pathogenic microorganisms. At least some of the temperature rise is due to the exothermic reaction with the alkali. The product is allowed to air cure for about 10 days after achieving the desired solids content. Drying and curing may be effected by windrowing, turn-over or other forced air methods, and curing or aeration time is dependent on the aeration procedure and other factors, such as ambient temperature and humidity, and clearly need to be determined, for any particular circumstances, experimentally to see that the required end point has been reached. This involves taking samples to measure the solids content, testing for:

animal viruses—less than one plaque forming unit per 100 ml salmonella bacteria—less than three colony forming units per 100 ml parasites—less than one viable egg per 100 ml significant regrowth of the pathogenic microorganisms—there should be none and assessing the reduction of odour to a level tolerable in a closed room and that this reduction is maintained indefinitely under any climatic conditions, and whether flies are less attracted to the product. At the same time, the presence of at least some beneficial non-pathogenic microorganisms must be established.

If method b) is used, the minimum recommended time for maintaining the temperature at least 50° C. (but not so high as to destroy all non-pathogenic microorganisms) is at least 12 hours and the heat treated alkaline stabilised dewatered sludge cake is then air dried (while the pH remains above 12 for at least 3 days) through intermittent turning of windrows until a minimum of 50% solids content is achieved.

GB 2 276 876 A, which refers to EP 0 283 153, describes treatment of sewage sludge having a solids content of at least 15% by weight with an alkaline material containing free lime, and storing and/or drying and/or composting the resultant mixture, adding sufficient lime to the mixture to achieve a pH of at least 10. Higher pH values, even higher than 12, are not ruled out, but it is suggested that excellent reduction in pathogens can be achieved at pH levels below 12 with reduced evolution of ammonia, which renders the treated sludge and its surroundings less unpleasant and means that the treated material retains more nitrogen increasing its value as a fertiliser.

The method of GB 2 276 876 involves dewatering the sludge, e.g. in a belt press, and measuring it using a weigh hopper into a mixer into which is delivered alkaline material in the appropriate amount, the mixed material being delivered to a skip to deliver it to a windrowing area where it is turned periodically, normally for a period up to seven days. However, it is suggested also that provided the amount of calcium oxide that has been introduced is sufficient to raise the pH to a value greater than 12, and sufficient, indeed, to ensure that it stays above 12 for at least 2 hours, then it is possible to store the mix for not less than two hours, but then apply it directly to the land.

It is apparent that the methods described in these two specifications are labour intensive and to a large extent dependent upon a subjective judgement (the assessment of odour in a closed room, for example) or upon results of biological tests which themselves could take days or weeks before you have a result.

It is necessary, for effective treatment, to mix the alkali with dewatered sludge, but sludge, nonetheless that comprises a substantial quantity of water, as it is only in the presence of water that the desired exothermic chemical reaction takes place. The end product—as is clear from the specification discussed—is required to have less water content than is appropriate during the heat-development stage. It is an essential part of the process, then, that the product be eventually dried, and this is the reason for treating it by windrowing. Windrowing, especially aeration by turning over windrows, is not only labour intensive and floor space intensive, but is a slow method of drying, and exposes personnel to excessive levels of ammonia and volatile organic compounds.

There are further problems and disadvantages with prior art methods such as those disclosed in EP 0 283 153 and GB 2 276 876. For example, a relatively large quantity of alkaline material is required (typically 30 to 50% by sludge wet weight or 150–200% by sludge dry weight): so much so that the alkaline material constitutes a significant proportion of the end product produced by the treatment. This adds to costs in three significant ways. Firstly, there are costs associated with providing large quantities of alkaline material. Secondly, there are considerable costs associated with materials, handling of increased mixed product volume through the heat pulse and windrow formation and turning. Thirdly, there are transportation costs associated with the removal of the end product from the site. A further consequence is that, because a significant proportion of the end product is alkaline material, the relative proportions of nutrients such as nitrogen and phosphorus in the end product are not only reduced but also are fixed due to the high pH of the product. This reduces the possible value of the end product as an agricultural fertiliser. Furthermore, since such large quantities of alkaline materials are added, a pH greater than 12 is maintained for extended periods and may result in the product being classified as a special waste by regulatory bodies. Special waste requires special land fill disposal.

It is difficult, if not impossible, to evenly control, culture and measure the temperature of a windrowed product. Furthermore, it has been found that, in practise, considerable problems with product odour, in particular ammonia, can be encountered when the method of EP 0 283 153 is employed, both during production and in the finished product.

It should be noted that, under United States of America regulations for the treatment of sewage sludge (EPA Rule 503 Regulations), it is necessary not only to effect pasteurisation (Class A pathogen reduction) but also to effect stabilisation of the product. The latter is termed the Vector Attraction Reduction Requirement, and is described at Rule 503.33(b). For the avoidance of doubt, the terms "stabilisers" and "stabilisation" as used herein refer to a process which satisfies the Vector Reduction Requirement as set forth in US EPA Rule 503.33(b).

SUMMARY OF THE INVENTION

The present invention overcomes the aforesaid problems and disadvantages and provides a new paradigm in the treatment of sewage sludge. The present invention provides processes and apparatus for treating sewage sludge which are more efficient, less labour and space intensive, and more controllable, (so as not to depend upon the results of bio-technological testing, inaccurate manual sampling, and measurement procedures such as dry solids content, temperature and pH) than prior art processes to date, and which provide both continuous processing and on line process monitoring and management. This ensures that the critical process steps which ensure pathogen destruction and subsequent long term stability of the treated sludge are achieved. In particular, the tonnage of end product produced after the treatment of a given amount of sludge is significantly reduced, resulting in lower production, handling and transportation costs. This is principally because the amount of sludge and alkaline material required in order to effect pasteurisation is significantly reduced. A further advantage associated with reduced usage of alkaline material is further cost savings. Furthermore, in contrast to the methods of EP 0 283 153 and GB 2 276 876, the present invention does not involve the use of aeration methods such as windrowing. Furtherstill, the floor space (or "footprint") required by the apparatus of the present invention is significantly reduced. Yet further, odours produced by the present invention are minimised and easily dealt with. Yet further still, the end product produced by the process of the present invention is of superior quality being high in available nutrients and substantially odour free. Furthermore, since significantly less alkaline material is utilised, both process temperature control and post process pH reduction are achieved more effectively.

According to a first aspect of the present invention there is provided a process for treating sewage or similar organic sludge to produce a pasteurised and dried product comprising the steps of:

drying the sludge to substantially the desired dry solids content of the product;

and thereafter adding an alkaline admixture to the dried sludge in order to pasteurise and/or stabilise the sludge and thereby produce the product without employing subsequent drying by aeration.

There are numerous advantages which accrue from the approach of drying the sludge prior to, or consequent with, pasteurisation (as opposed to drying after pasteurisation, as disclosed in EP 0283153 and GB 2276876). Post drying, the sludge weight and volume is significantly reduced when comparing feedstock output quantities. Only a very small total amount of alkaline admixture is required to pasteurise (and/or stabilise) the mixture. These provide significant cost advantages and reduce the tonnage of product associated with a given amount of wet sludge starting material. Despite the low quantities of alkaline admixture used, excellent temperature pasteurisation and stabilisation profiles over an extended period of time can be obtained. Furthermore, end products having excellent, higher dry solids contents can be readily produced. It is well known that the higher the product dry solids content, the better the long term stability of the end product. Further time and space intensive and costly drying steps, such as windrowing or other aeration techniques are not required. The method can be used to treat raw sludge feedstock, which has the advantage that an expensive sludge digester stage is not required. However, the method can also be used to treat digested sludge feedstock.

The alkaline admixture may be added to the dried sludge at a mixing ratio of less than 25% by weight of sludge dry solids, preferably less than 20%, most preferably less than 15%. This represents a very low proportion of the eventually formed product, but is, surprisingly, sufficient to pasteurise and/or stabilise the sludge and produce high quality product.

Preferably, the alkaline admixture comprises lime which, advantageously, may be pulverised or otherwise finely granularised. It has been found that the greater surface area associated with lime treated in this manner improves the pasteurisation and stabilisation processes. The drying of the sludge may be effected by a thin film dryer, which may be a horizontal, single pass, indirectly heated thin film dryer. Such dryers are manufactured by Buss-SMS GmbH of Pratteln, Switzerland. These dryers operate on a plug flow basis, i.e., first in first out (FIFO), which has the advantage that the residence time of sludge in the dryer can be accurately established. Also, it is possible to completely pasteurise the sludge during the drying step.

The sludge may be dried to a dry solids content of greater than 50%, preferably in the range 52 to 65%. An advantage of limiting the drying to this range is that high fibre content sludges (with consequent risks of fires and explosions in the dried sludge) are not produced.

The method may further comprise the step of dewatering the sludge to produce dewatered sludge cake prior to further drying of the sludge.

The step of drying the sludge may effect partial or complete pasteurisation of the sludge. This assists in keeping the amount of alkaline admixture required to a minimum. Additionally, it should be noted that since the drying of the sludge is not accomplished at high pHs, the odours associated with this drying step do not include ammonia. Rather, volatile species or gases such as volatile organic compounds, hydrogen sulphide and various mercaptans are produced, which can be easily removed by a biological filter, a scrubber or a regenerative thermal oxidiser. The effect of this is to significantly reduce the odour associated with sludge treatment (ammonia and certain volatile organic compounds being the prime sources of concern regarding such odours). If an indirect design of dryer is utilised, only the non-condensible gas stream needs to be scrubbed, and thus the volume of gas, and consequently the scrubber size, is minimised.

The product may be continuously discharged. The pasteurisation and/or stabilisation of the mixture may be performed in a FIFO (first in first out) hopper with or without recycling of the mixture.

Green waste, such as grass clippings and leaves, may be added to the sludge prior to the drying of the sludge to substantially the desired dry solids content.

Gases may be removed during pasteurisation and introduced to a dryer which is used for drying the sludge. An advantage is that particulates, ammonia and volatile organic compounds (VOCs) emanating from the pasteurisation process are removed at the dryer. Particulates can cause problems if introduced to a waste treatment stage such as a regenerative thermal oxidiser (RTO), but if waste streams are introduced to the RTO from the dryer (some having been routed from a pasteurisation unit), then these problems are avoided. A further advantage is that the size of the RTO is minimised, since the gases for the pasteurisation stage substitute for leakage air which is necessary for efficient operation of the dryer.

Surplus heat associated with the drying of the sludge may be recovered, and used for a purpose associated with the process or a facility performing the process. The recovered heat may be used for production space heating and/or to heat an ammonia scrubbing process. In this way, really efficient use of energy is achieved.

The method may be continuous, although batchwise or semicontinuous operation is possible.

According to a second aspect of the invention there is provided a facility for treating sewage sludge or similar organic sludge according to the first aspect of the invention; comprising:

means for drying the sludge to substantially the dry solids content of the product;

means for adding an alkaline admixture to the dried sludge; and means for retaining the mixture and the added alkaline admixture in order to pasteurise and/or commence stabilisation of the mixture and thereby produce the product without employing subsequent drying by aeration.

The means for retaining the dried sludge and the added alkaline admixture may comprise a first in first out (FIFO) hopper.

The facility may further comprise means for dewatering the sludge prior to further drying of the sludge, which means may comprise a belt press arrangement, which might be a multi-stage belt press.

The means for drying the sludge may comprise a thin film dryer, which may comprise a horizontal, single pass, indirectly heated thin film dryer.

The facility may further comprise at least one store containing lime, the lime being used as the alkaline admixture or as part of the admixture. The lime may be pulverised or otherwise finely granularised.

The facility may further comprise conducting means to remove gases from the means for retaining the mixture and to introduce said gases to the means for drying the sludge. This can replace leakage intake air which is traditionally required with dryers.

The facility may further comprise heat recovery means for recovering surplus heat associated with the drying of the sludge and conducting the recovered surplus heat to a destination so that the recovered surplus heat can be used for a purpose associated with the process or the facility. The facility may further comprise an ammonia scrubbing system which can be heated using the recovered surplus heat.

The means for drying may be adapted to also effect complete pasteurisation of the sludge.

According to a third aspect of the invention there is provided a dried sludge product produced by the process of the first aspect of the invention. Such product can have a high dry solids content (50% or greater), and is high in nutrients. The product can be used as a manufactured top soil product, and as agricultural fertiliser.

BRIEF DESCRIPTION OF THE DRAWINGS

Embodiments of processes and facilities in accordance with the invention will now be described with reference to the accompanying drawings, in which:

FIG. 5 shows the mixing of the sludge with lime;

FIG. 6 shows the pasteurisation and stabilisation of the sludge/lime mixture; and FIG. 7 shows heat recovery and waste treatment apparatus.

DETAILED DESCRIPTION OF THE INVENTION

Figure 1:
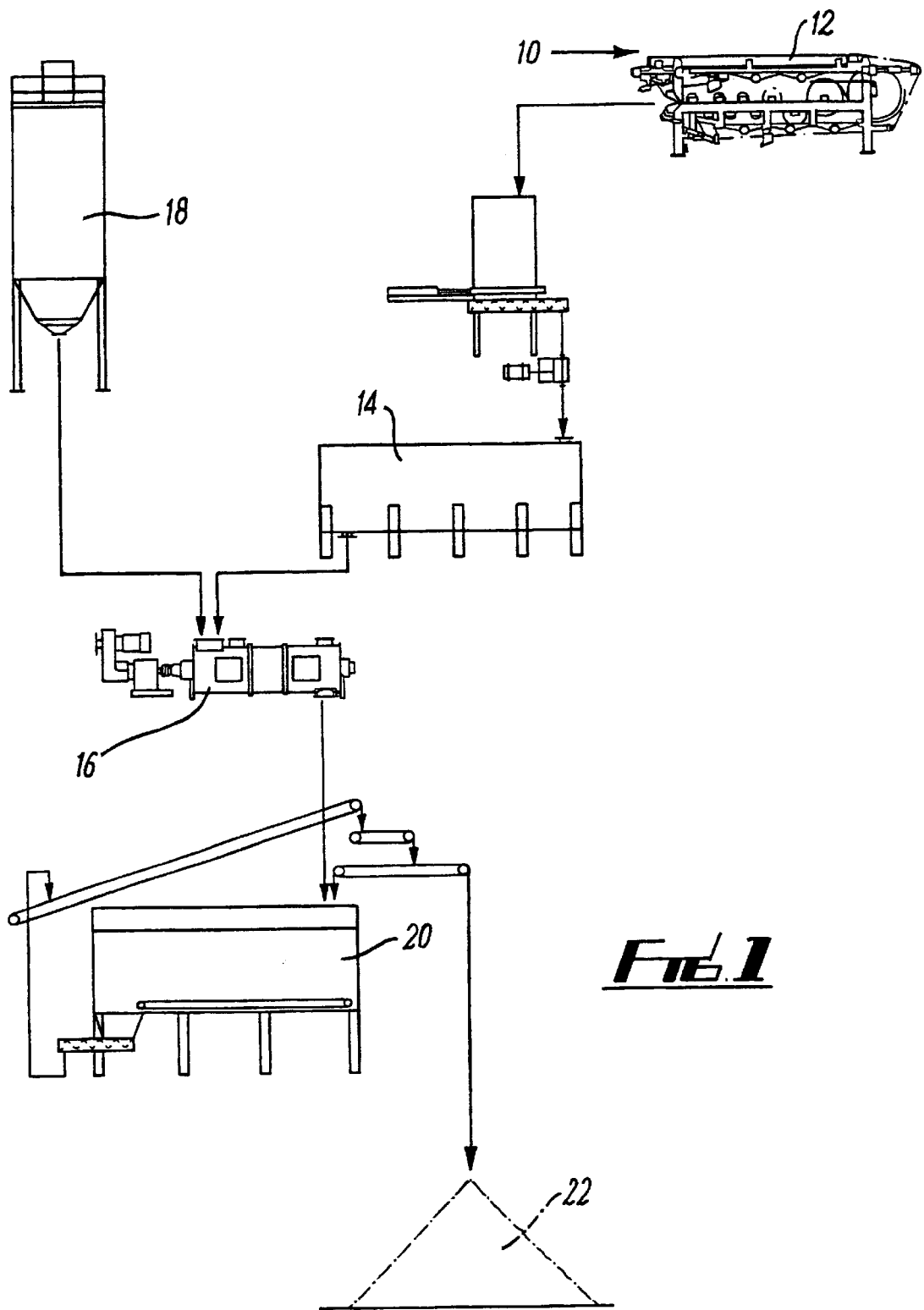
FIG. 1 is a schematic flow diagram of a process according to the invention.

FIG. 1 depicts an embodiment of the process of the present invention. Liquid sewage is introduced to the process at 10, the sewage being dewatered using a belt press system 12 to produce a sludge cake. Typically, the dry solids content of the sludge cake is ca. 27%. After dewatering, the sludge cake is transported by a transportation system (not shown) to a dryer 14. The transportation system can comprise known means such as belt conveyors and discharge ploughs, as well as infra-red moisture sensors and weigh belt systems providing continuous monitoring. Optionally, the first portion can enter a blender where green waste such as grass clippings can be introduced.

The dryer 14 dries the sludge at a suitable dewatering temperature for a length of time sufficient to produce dried sludge of a desired dry solids content, which is substantially the desired dry solids content of the product.

It is advantageous to dispose of green waste in this way for a number of reasons. Green waste has a very high water content, typically about 80%, and it therefore very bulky. In the USA, and in other countries, green waste cannot be disposed of in a landfill, but, rather, municipalities provide a collection service for so-called "yard waste". In addition to the cost of collection, the cost of disposal is high, since inter alia composting facilities are required. Such facilities are expensive to operate and run a risk of being the subject of complaints concerning odour. The present invention provides a more convenient way of disposing of green waste. Furthermore, since the dry portion of the green waste (ca. 20% of the original weight) is high in organic matter and nutrients such as N and P, it provides benefits to the end product.

The dried sludge is transported from the dryer 14 by means such as conveyor belts to a mixer 16, such as a continuous plough share mixer, where alkaline admixture from a silo 18 is added and mixed therewith. The mixture is transported to a pasteuriser 20, which can be a first in first out hopper. At the end of the process, the nutrient rich end product 22 is discharged using a belt conveyor arrangement.

Excellent results have been obtained when the alkaline admixture is CaO, although the invention is not limited in this regard, it being possible that other alkaline admixtures comprising one or more components might be utilised with the present invention.

It is highly advantageous that, owing to the drying of the sludge, the mixture of the sludge and alkaline admixture is already very dry, since further drying processes (such as windrowing), with all their attendant drawbacks, are unnecessary. It is believed that it is significant that when the alkaline admixture is added to the dried sludge, the sludge is still significantly hot (ca. 40° to 60° or even greater) after the drying process. It is believed that the drying process imparts much of the heat required in a pasteurisation step, and that this enables pasteurisation to take place using relatively minuscule amounts of alkaline admixture. In contrast, it is likely that the relatively large amounts of alkaline admixture associated with the prior art methods of EP 0283153 and GB 2276876 are in part necessitated by the need to generate a pasteurising heat pulse from ambient temperature. This is achieved, in these prior art techniques, by the exothermic reaction of the alkaline admixture with water, thereby requiring additional quantities of expensive alkaline admixture.

It is also advantageous that the drying of the sludge can itself partially or completely pasteurise the sludge portion. The upshot of partial pasteurisation is that a relatively small amount of CaO is required in order to effect pasteurisation (and stabilisation). The upshot of complete pasteurisation by the drying process is that alkaline admixture is only required in order to effect stabilisation. This can be achieved by ensuring that the pH of the dried sludge is raised to 12 or higher for two hours or more, and then at a pH of 11.5 or higher for an additional 22 hours, as set forth in US EPC Rule 503.33(b)(6).

It is possible that the addition of CaO can result in further drying due to the exothermic reaction with water, but it should be noted that this is not necessary to effect further drying. Typically, the amount of CaO required is less than 25% by dry weight of the dried sludge (or sludge/green waste mixture), preferably less than 20%, most preferably less than 15%. A further benefit is that the pasteurisation process can be relatively short, being less than a day. It can be less than 5 hours, or 4 hours, even about a couple of hours. Typically, the mixture is retained for pasteurisation for about 15 hours, in order to ensure that the mixture is retained at pasteurising temperature for 12 hours or more. However, the present invention recognises that shorter pasteurising times and temperatures are possible. During the pasteurisation/drying process, a pH of 12 or greater and a temperature up to ca. 70° C., are obtained. It is believed that adequate pasteurisation can be achieved at pHs lower than 12, and/or at temperatures lower than ca. 70° C. Therefore, the invention is not limited in this respect. A further benefit of the invention is that the relatively small amount of CaO in the end product, and the dryness of the end product, results in a reduction in the amount of end product produced for a given input of sludge. A yet further benefit is rapid cooling of the product. A yet further benefit still is that, since an excess of CaO is not used, the pH of the product declines rapidly over time as CaO is consumed.

Typically, the temperature of the dried sludge after addition of alkaline admixture rises to, and is maintained homogeneously at, a minimum of 65° C. for up to 5 hours within insulated reactor vessels, during which time the pH is maintained at pH 12.0 or greater. During a subsequent 24 hour period the pH of the product is greater than 11.5. In this way, the requirements of EPA Rule 503.33(b)(6) may be met, and stabilisation of the product can be achieved. It should be noted that typically the stabilisation process is not carried out entirely in the pasteuriser. Rather, the stabilisation process continues once the product has been discharged from the pasteuriser.

The invention has been found to work particularly well when the CaO is pulverised or otherwise finely granularised. It is believed that this is due to the greater surface area available to participate in the reactions associated with the pasteurisation process.

Additionally, the invention has been found to work particularly well when horizontal, single pass thin film dryers which operate on a plug flow basis, i.e., FIFO, are used to dry the sludge. Such dryers are manufactured by, for example, Buss-SMS GmbH of Hohenrainstrasse 10, Pratteln 1, Switzerland. Buss-SMS dryer type D-0100 has been found to be very suitable for continuous drying of sludge to dryness at least in the range 50 to 60% dry solids content. Furthermore, the dried sludge can be introduced to the alkaline admixture mixing stage whilst significantly hot (ca. 60° C.), so that it is relatively easy to attain pasteurisation and/or stabilisation temperature. A horizontal thin film dryer such as the Buss-SMS D-0100 can be incorporated into the system, by providing a feed pump with variable speed drive, conical feed hopper and agitator, a condenser and condensate receiver, a liquid ring pump (for drawing off incondensible vapours) and heating means. Blades in the dryer push the sludge through the dryer (in a generally horizontal direction in the case of a horizontal thin film dryer), whilst further blades ensure that the sludge is repeatedly spread thinly on to the dryer walls. The walls are indirectly heated by heating means, which can comprise, for example, a thermal oil heater or a steam boiler. It is quite possible, however, that other forms of drying can be usefully employed in the place of thin film dryers.

However, an advantage with thin film dryers is that, the sludge can be homogeneously dried at a minimum sludge temperature of 100° C. for a minimum residence time of ca. 4 minutes. Such conditions are more than sufficient to effect complete pasteurisation of the sludge. In this instance, the alkaline admixture is merely used to stabilise the dried and pasteurised sludge. It is possible to install ceramic surfaces into the dryer in order to monitor the drying temperature.

In a number of mixing trials, various combinations of sludge dryness and CaO mixing ratios were employed. Sludge dryness in the range 50 to 59% dry solids content were employed. CaO was added in % ratios of 5 to 14%. It should be noted that the dryness of the final product was always only slightly greater than the dryness of the sludge before mixing. For example, sludge at 51% dry solids content treated with 14.1% CaO resulted in a product of 56.4% dry solids content, whilst sludge at 59% dry solids content with 5.3% CaO added resulted in a product of 65.1% dry solids content.

Figure 2:
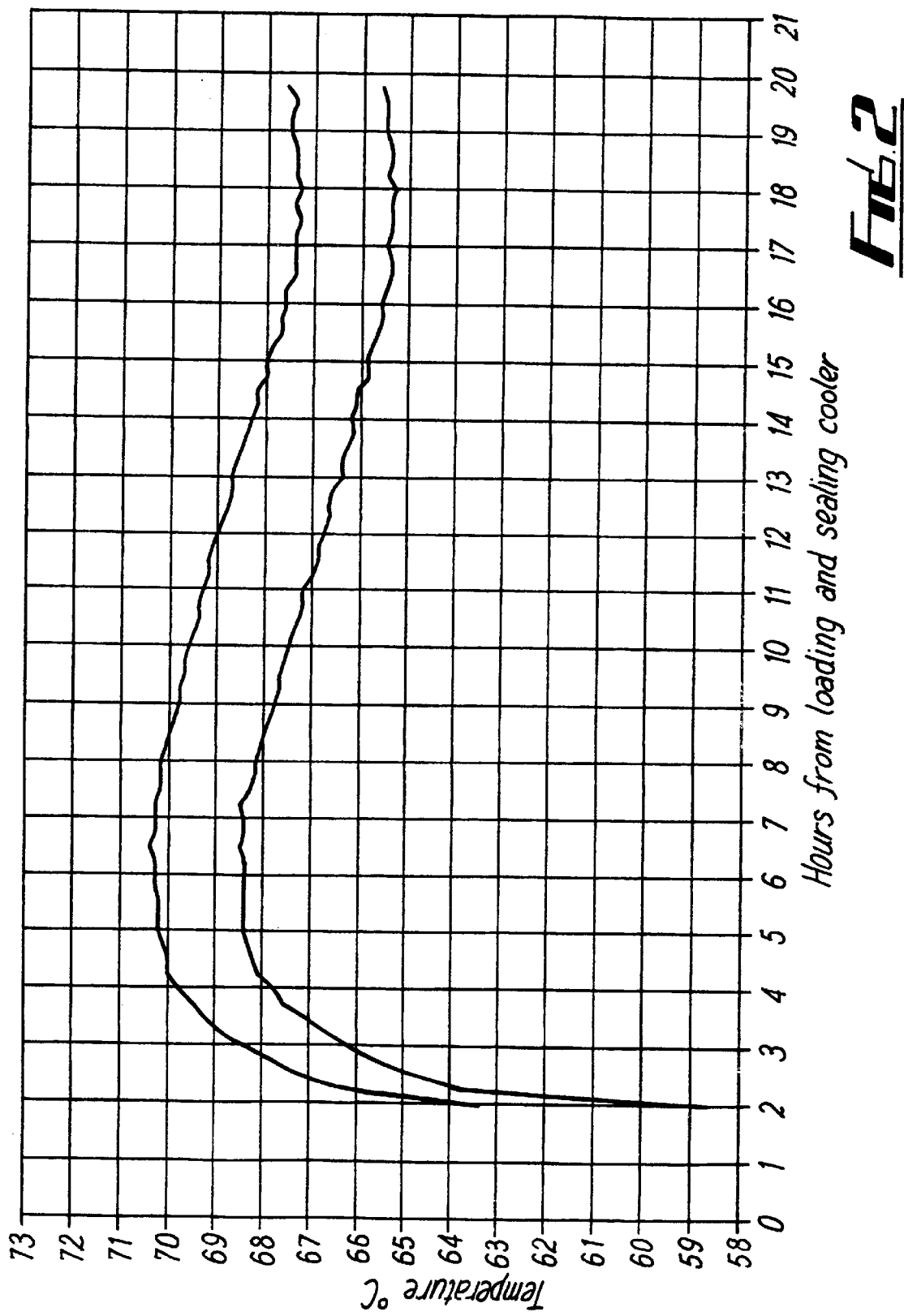
FIG. 2 shows the temperature of a mixture of dried sludge and lime over a period of time.

The products in these trials were overall of good or very good quality, this being assessed using a number of criteria, namely granularity, stickiness, odour and compactibility. FIG. 2 shows the temperature profile of a dried sludge/CaO mixture over a period of time. In this instance, dried sludge at 57% dry solids content was mixed with 8.7% pulverised CaO. The results of two separate trials under these conditions are shown. Excellent heat pulse profiles are obtained in which high temperatures are maintained for at least 17 hours. Furthermore, a pH of 12.2 was measured after the sludge and CaO were mixed. The combination of high temperatures and high pH are conducive to good pasteurisation and stabilisation, although it is possible that lower temperatures and/or lower pHs might suffice.

The entire process can be run continuously or near continuously. It is possible to utilise an individual or a plurality of belt press devices in order to ensure a constant or near constant flow of dewatered sludge cake. Similarly, a plurality of dryers and mixers can be used to ensure a continuous throughput. The pasteurisation (and/or stabilisation) step can be performed continuously using a first in first out hopper or like device. Because the pasteurisation (and/or stabilisation) step is relatively short, pasteurisation (and/or stabilisation) can be accomplished during a single pass through the hopper: in other words, recycling of material through the hopper is not necessary, although recycling may be utilised to remove small residual amounts of ammonia and volatile organic compounds (VOCs) from the finished product.

Ammonia evolved during the pasteurisation (and/or stabilisation) step can be removed using ammonia scrubbers. However, the amount of ammonia evolved is reduced, since partial or complete pasteurisation of the first portion is achievable during drying of the first portion. Furthermore, the dried sludge offers the benefit of less odour potential, generally. It is advantageous that, because this "pre-pasteurisation" of the sludge does not take place at high pH, ammonia is not evolved in any substantial quantity during this process. Rather odorous compounds such as volatile organic compounds, hydrogen sulphide and numerous mercaptans are produced, which are easily dealt with using biological filters, scrubbers or regenerative thermal oxidisers. As a result the present invention has the advantage that problems associated with odours are much reduced.

Figure 3:
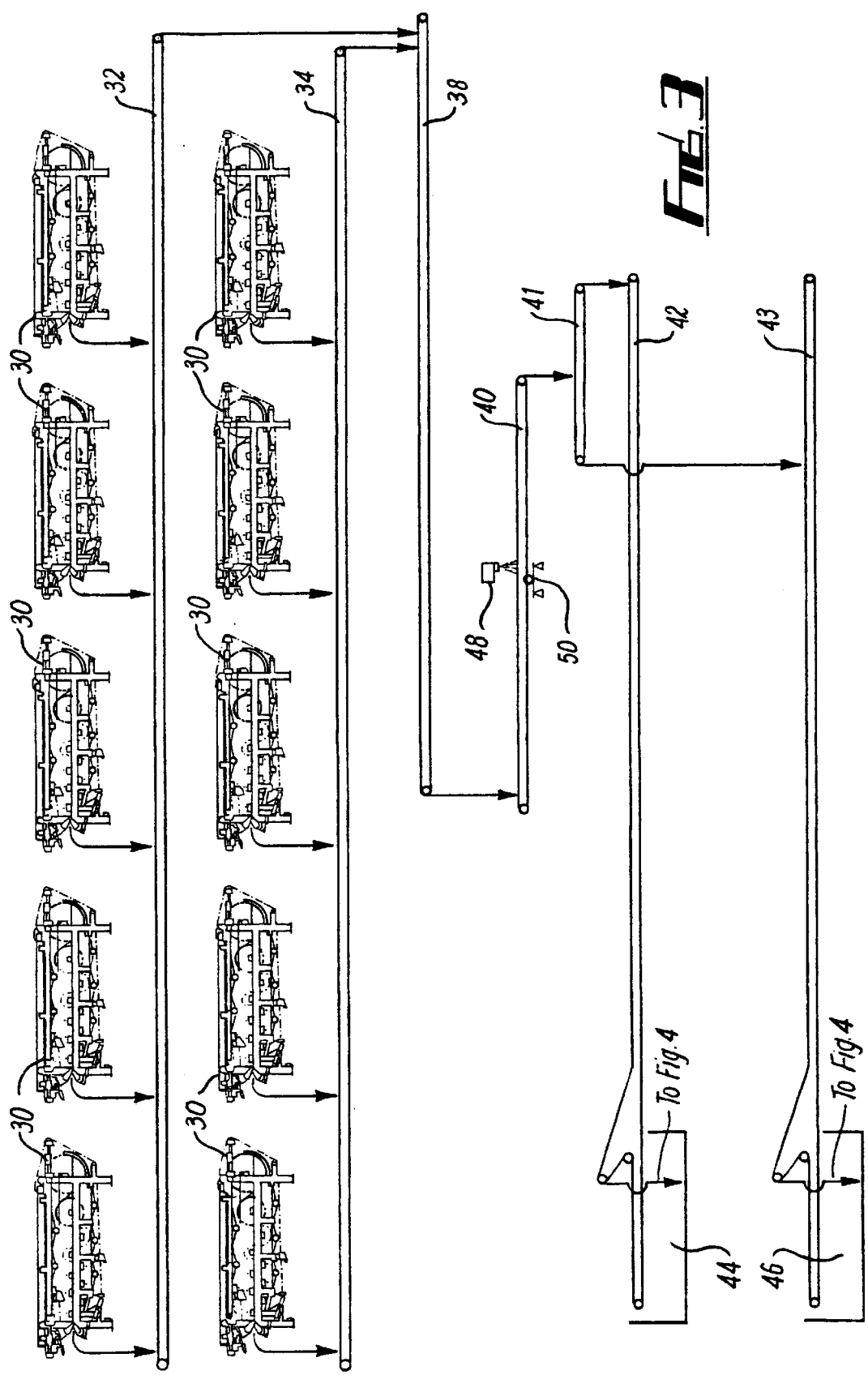
FIG. 3 shows a preparative sludge dewatering stage.
Figure 4:
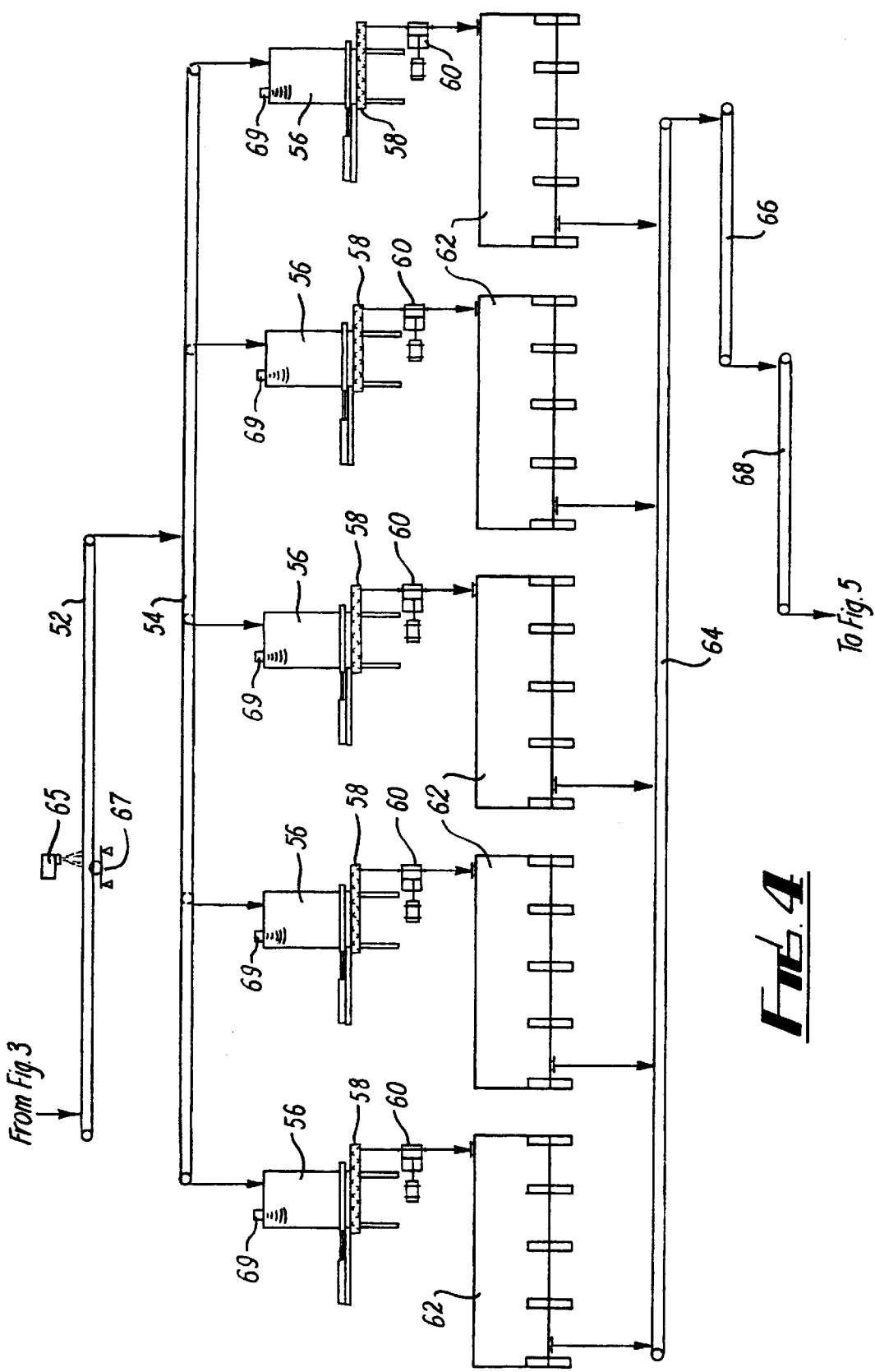
FIG. 4 shows further drying of the sludge.

FIGS. 3 to 5 show an arrangement according to the invention which is capable of operating continuously and with emergency back-up on a scale sufficient to meet the demands of large regional municipal authorities.

FIG. 3 shows a preparative sludge dewatering stage, in which sludge is dewatered by belt presses 30, and conveyed via conveyors 32, 34, 36, 38, 40, 41, 42, 43. Moisture content can be monitored by infra-red scanner 48 and in line weigh belt system 50, and the on line, continuous data thus provided can be used to control the overall process. Typically, dewatered sludge is of a dry solids content of ca. 27%, although this figure is not a limiting one.

FIG. 4 shows the further drying of the sludge after the dewatering stage. Conveyor belts 52, 54 transport the dewatered sludge cake to storage bins 56. Screw feeds 58 and feed pumps 60 then transport the dewatered sludge cake to the dryers 62. After drying, conveyors 64, 66, 68 transport the dried sludge to a mixing zone (shown in FIG. 5). Infra-red moisture sensor 64 and weight belt system 66 permit moisture content to be monitored continuously. Ultrasonic level sensors 68 on the storage bins 58 allow the correct quantity of dewatered sludge cake to be delivered to each storage bin 58 as part of an automatic process control system.

FIG. 5 shows the mixing of the dried sludge with alkaline admixture. Silos 70 store lime whilst silos 72 can store an inert additional alkaline material such as pulverised fuel ash (PFA). The purpose of the PFA is to raise the pH to the desired value without providing the reactivity provided by lime. Screw conveyors 74 feed lime and, optionally, PFA in their desired amounts to mixers 76 such as a continuous plough share mixer. Dried sludge which is transported by conveyor 68 (shown in FIG. 4) is transferred to conveyor 78 to a 100 ton capacity storage unit 80. A weight belt feed conveyor 82 then transports the dried sludge to one or more discharge ploughs 84 from which the sludge is dispensed into a mixer 76 for mixing with the alkaline admixture.

Infa-red moisture sensors 86 and weigh belt systems 88 are employed for the purposes previously described.

After mixing, the mixture comprising the alkaline admixture and the dried sludge is transported by conveyor 90 towards a pasteurisation section which is shown in in FIG. 6. Referring to FIG. 6, further conveyors 92, 94, 96 transport the mixture to pasteuriser units 98 which are first in first out (FIFO) hoppers. The mixture is transported along a FIFO hopper and discharged, at the opposite end from which it entered, using discharge screw feeders 100. Thereafter, conveyors 102, 104, 106 can be used to either recycle the mixture back into a FIFO hopper 98, or to discharge the product onto a conveyor 108. Recycling is not required for any drying process, but can be performed in order to remove volatile species. The product is then removed from the facility using conveyor 108 and stockpile belt conveyors 110. Infa-red moisture sensors 112 and weight belt systems 114 enable the moisture content and weight of the final product to the monitored.

FIG. 7 shows how surplus or waste energy can be utilised for various useful support processes, in particular exhaust gas treatment. A thermal oil heater unit 120 is used to heat a thin film dryer 122. The oil in the unit 120 is heated by burning either an oil supply 124 or a gas supply 126. Excess heat from this process can be utilised to heat up either a thermal oil or a water heat exchanger 128. The heat exchanger can then be used to heat gas volumes passing through an ammonia scrubber systems (shown generally at 130). Heat not recovered in this way is ultimately lost from a heater stack 132.

In a similar manner, heat from a regenerative thermal oxidising unit 134 (which is discussed in more detail below) is recovered using a water heat exchange 136 (otherwise such heat is lost to atmosphere via a stack 138). The hot water from the heat exchange 136 can be used in the ammonia scrubber system 130.

Instead of feeding into an ammonia scrubber system, the hot water provided by the heat exchangers could be utilised for other purposes, such as process washdowns, space heating and general hot water service requirements, thereby eliminating or reducing the extent of traditional means of water heating.

During drying of the sludge in the thin film dryer 122, the sludge can attain high temperatures, such as 100° C. or above, periods of ca. 3 to 5 minutes. In addition to the evaporation of water, vapours are produced which can additionally contain quantities of various gases and volatile organic compounds (VOCs) which have been entrained in the original discharged sludge. These volatiles need to be drawn from the dryer 122 whilst maintaining only a slight negative pressure therein, and this is achieved by introducing leakage air into the dryer 122 in a manner which is described more fully below.

Vapours are drawn from the dryer 122 by a fan (not shown) which discharges the vapours into a vapour condenser 140. Two waste streams are produced, namely a condensible waste stream and a non-condensible waste stream. Condensibles, which comprise in the main heavily BOD and COD contaminated water, are pumped back into the primary settlement tanks of on-site sewage treatment process stream by pumps 142, 144. Alternatively, the condensible waste stream could be pumped into the head of the inlet works. In either case, the condensible waste stream is diluted by the mass flow through the sewage treatment process, and treated thereby before finally being discharged as final effluent. Final effluent can be pumped by a pumping station 146 as cooling water through a heat exchanger 148 to cool the condensible waste stream.

The non-condensible waste stream comprises various gaseous materials and organic compounds which must not be discharged to atmosphere, and instead are removed via the regenerative thermal oxidising unit 134. A fan 150 impels the non-condensible waste stream into the oxidising unit 134.

Each pasteurising unit 152 is provided with a fan 154 which removes gases generated during pasteurisation. Such gases can include water vapour, ammonia, VOCs. The fans 154 can remove fine particulates such as alkaline powders or dried sludge particulates which might otherwise cause problems at the oxidising unit.

Conveyors 156 and a sludge buffer bin 158 comprise part of the post-drying sludge treatment process. The conveyors 156 and buffer bin 158 are ventilated in order to remove ongoing water vapour condensates and VOCs by way of maintaining enclosures under slight negative pressure. A further advantage of such ventilation is that, if required, it can achieve a degree of cooling of the dried sludge prior to storage and mixing with alkaline admixture.

A further facet of the system is that exhaust gases emanating from the pasteurising units 152, conveyors 156 and buffer bin 158 can be fed to the dryer 122 in order to provide the leakage air required by the dryer 122. Since the environment within the dryer 122 is saturated with moisture, any particulates and gases fed into the dryer 122 become blended within the sludge drying process, and thus the dryer exhaust stream through the condenser 140 and the condensible and non-condensable waste streams ultimately deal with the total blended vapour discharge. In this way, regenerative thermal oxidising unit 134 is not required to deal with particulates. Furthermore, the gas throughput which the oxidising unit 134 is required to handle is minimised since only a single non-condensible waste stream requires treatment.

The entire process can be automated and controlled by computer. The computer can control the rates of dewatered sludge generation and throughput, number of dryers in operation and throughput, sludge temperature profile within each dryer, the rates of addition of the dried sludge and alkaline admixture and, furthermore, can make on-line adjustments to the process based on process information such as moisture content, bin levels and weights which are provided by the various sensors. It is quite possible to provide further information to facilitate this on-line control: for example, temperature sensors might be employed. Thus, all critical process control data can be displayed, recorded and stored in order to satisfy whatever regulatory reporting data may be required.

The system shown in FIGS. 3 to 6 is designed to have excess capacity so that unusually high flow rates and/or component failure can be dealt with. For example, at average throughput only seven belt presses would be in use. This number can rise to ten for peak operation. Similarly, at mean loading only three dyers and two pasteurising units are used with two of each as standby. Such a scheme is not a limiting constraint on the invention, and the skilled person would readily appreciate that many other system variations are possible, and indeed may be desirable depending on the precise nature of required treatment. The facility described with reference to FIG. 3 to 6 is capable of handling a time averaged sludge throughput of greater than 155 US short dry tons per day with sufficient reserve capacity to handle up to 50% higher peak flow rates and to provide emergency equipment cover at all throughputs. The facility can run continuously for 24 hours a day, 365 days a year.

Due to the reduction in costs associated with the present invention, and the fact that the present invention provides useful, consistent and saleable products (i.e., high quality dried sludge products), it is believed that a facility according to the present invention can provide a return on capital investment within 4 to 5 years of operation.

What is claimed is:

1. A process for treating organic sludge to produce a pasteurized and dried product comprising the steps of:
   drying the sludge to substantially the desired dry solids content of the product and thereby at least partially pasteurising the sludge;
   and thereafter adding an alkaline admixture to the dried sludge in order to optionally further pasteurize and stabilize the sludge and thereby produce the product without employing subsequent drying by aeration.

2. A process according to claim 1 in which the alkaline admixture is added to the dried sludge at a mixing ratio of less than 25% by weight of sludge dry solids.

3. A process according to claim 2 in which the alkaline admixture is added to the dried sludge at a mixing ratio of less than 20% by weight of sludge dry solids.

4. A process according to claim 3 in which the alkaline admixture is added to the dried sludge at a mixing ratio of less than 15% by weight of sludge dry solids.

5. A process according to claim 1 in which drying of the sludge is effected by a thin film dryer.

6. A process according to claim 5 in which the drying is effected by a horizontal, single pass, indirectly heated thin film dryer.

7. A process according to claim 1 in which the sludge is dried to a dry solids contents of greater than 50%.

8. A process according to claim 7 in which the sludge is dried to a dry solids content in the range of about 52 to about 65%.

9. A process according to claim 1 in which the drying of the sludge effects partial pasteurisation of the sludge.

10. A process according to claim 1 in which the drying of the sludge effects complete pasteurisation of the sludge.

11. A process according to claim 1 in which the product is continuously discharged.

12. A process according to claim 11 in which the pasteurisation of the mixture is performed in a first in first out hopper.

13. A process according to claim 1 in which gases are removed during pasteurisation and introduced to a dryer which is used for drying the sludge.

14. A process according to claim 1 in which surplus heat associated with the drying of the sludge is recovered, and used for a purpose associated with the process or a facility performing the process.

15. A process according to claim 14 in which the recovered heat is used to heat an ammonia scrubbing process.

16. A continuous method according to claim 1.

17. A process according to claim 1 in which the alkaline admixture comprises lime.

18. A process according to claim 17 in which the lime is pulverized or otherwise finely granularised.

19. A process according to claim 1 further comprising the step of dewatering the sludge to produce dewatered sludge cake prior to the step of drying of the sludge.

20. A process according to claim 1 in which the organic sludge is sewage sludge.

21. A dried sludge product with a reduced alkaline content produced by a process according to claim 1 in which the alkaline admixture is added to the dried sludge at a mixing ratio of less than 25% by weight of sludge dry solids.

22. A facility for treating organic sludge in a process according to claim 1, comprising:
- means for drying the sludge to substantially the desired dry solids content of the product to at least partially pasteurise the sludge;
- means for adding an alkaline admixture to the dried sludge;
- means for retaining the mixture and the added alkaline admixture in order to further pasteurize and/or commence stabilization of the mixture and thereby produce the product without employing subsequent drying by aeration; and
- conducting means to remove gases from the means for retaining the mixture and to introduce said gases to the means for drying the sludge.

23. A facility according to claim 22 in which the means for retaining the dried sludge and the added alkaline admixture comprises a first in first out hopper.

24. A facility according to claim 22 further comprising means for dewatering the sludge prior to further drying of the sludge.

25. A facility according to claim 22 further comprising heat recovery means for recovering surplus heat associated with the drying of the sludge and conducting the recovered surplus heat to a destination so that the recovered surplus heat can be used for a purpose associated with the process or the facility.

26. A facility according to claim 25 further comprising an ammonia scrubbing system which can be heated using the recovered surplus heat.

27. A facility according to claim 22 in which the means for drying is adapted to also effect complete pasteurisation of the sludge.

28. A facility according to claim 22 in which the means for drying the sludge comprises a thin film dryer.

29. A facility according to claim 28 in which the dryer is a horizontal, single pass, indirectly heated thin film dryer.

30. A facility according to claim 22 further comprising at least one store containing lime, the lime being used as the alkaline admixture or as part of the admixture.

31. A facility according to claim 30 in which the lime is pulverized or otherwise finely granularised.

* * * * *